Aug. 4, 1959  C. B. CHARLTON ET AL  2,898,241

MANUFACTURING PROCESSES

Filed Dec. 4, 1956  3 Sheets-Sheet 1

Aug. 4, 1959     C. B. CHARLTON ET AL     2,898,241
MANUFACTURING PROCESSES
Filed Dec. 4, 1956     3 Sheets-Sheet 2
FIG. 9.
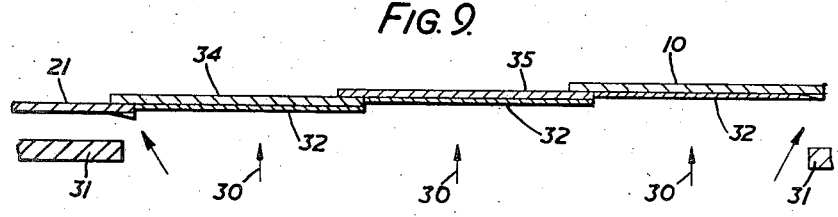
FIG. 10.
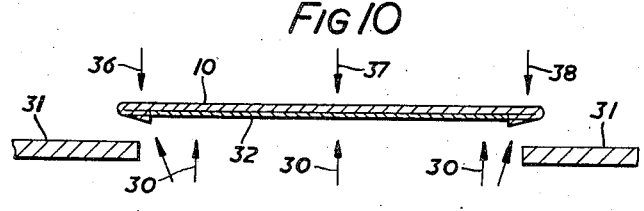
FIG. 11.
FIG. 12.
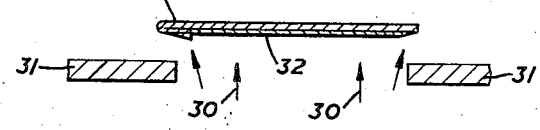
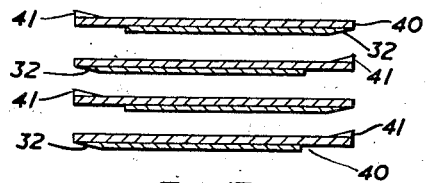
FIG. 13.

Aug. 4, 1959　　　C. B. CHARLTON ET AL　　　2,898,241
MANUFACTURING PROCESSES
Filed Dec. 4, 1956　　　　　　　　　　　　3 Sheets-Sheet 3

United States Patent Office 2,898,241
Patented Aug. 4, 1959

2,898,241

MANUFACTURING PROCESSES

Cyril Bradbury Charlton, Bromley, Charles Kasper Burchell, Croydon, and Martin Ludwig Loehr, Bayswater, London, England, assignors to Telephone Manufacturing Company Limited, London, England, a British company Application December 4, 1956, Serial No. 626,143

Claims priority, application Great Britain December 5, 1955

6 Claims. (Cl. 117—212)

This invention relates to a manufacturing process for the production of coatings upon limited areas of an extended support and to the coated supports thereby produced. The invention finds its chief application in the manufacture of electrical capacitors of the type comprising a thin support, which may be a dielectric such as paper, polystyrene or the like upon which a metallic film is deposited to form one electrode of the capacitor or which may be a metal film upon which a dielectric is deposited. A capacitor can be made by assembling at least two such coated supports, for example by rolling them up together. Hereinafter, for convenience, the invention will be described in relation to the manufacture of capacitors, but it is to be understood that the invention can be used elsewhere, where the same conditions apply. The invention is concerned with the production of a film of which the edges are well defined and, as far as possible, of uniform thickness, especially up to the edges of the film.

In a method embodying the present invention the support is moved with respect to the source from which the coating is produced so as to produce a deposit over an extended area of the support and to limit the area of deposit a mask is used; this mask is held fixed relative to the support and close to it, preferably indirect contact with it. Where the support is an elongated member such as a paper or metal web, the mask can likewise be an elongated member or web, and may be endless.

Figure 1:
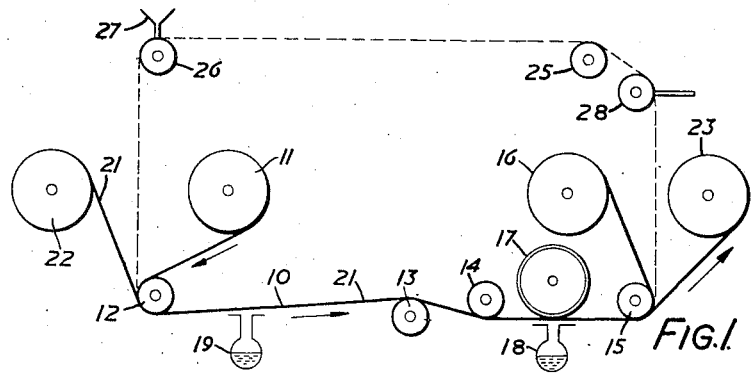
Figure 14:
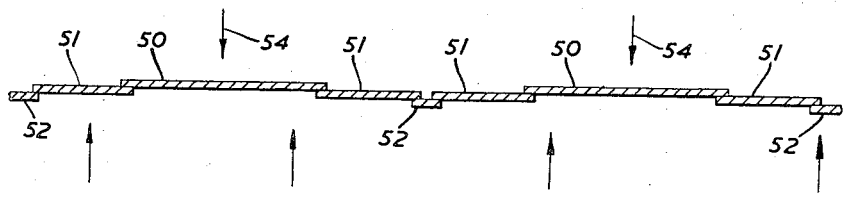
Figure 15:
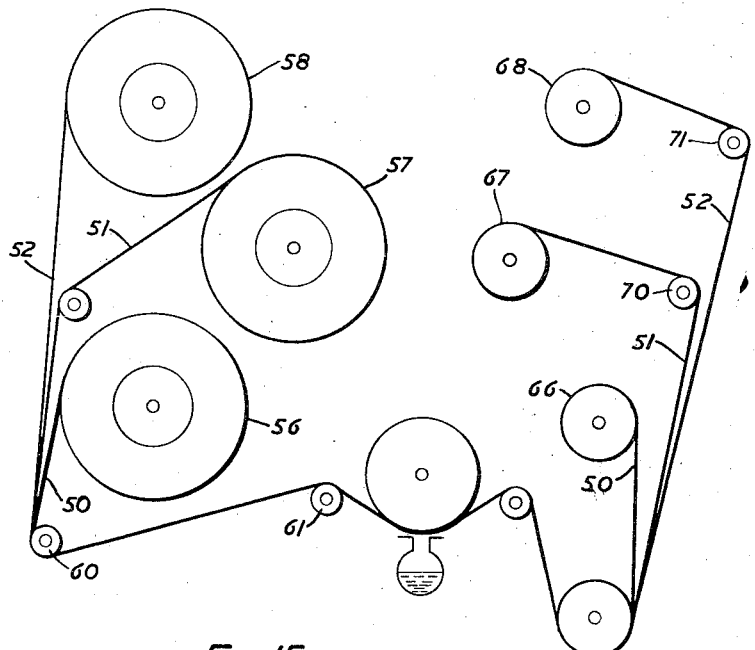

Other features and advantages of the invention will appear from the following description of embodiments thereof, in conjunction with the accompanying drawings, in which Figure 1 is a diagram showing the arrangement of the metallising equipment, Figures 2 to 14 are diagrammatic cross-sections of various web arrangements and Figure 15 is a diagram showing a method of disposing the various spools for the web arrangement of Figure 13.

In the embodiments of the invention about to be described, electric capacitors can be made from one or, more commonly, two webs of dielectric material to at least one surface of each of which is applied a metallic coating; each coating extends up to one longitudinal edge of the web but a narrow uncoated "free" edge is left on the other. The webs, with free edges on opposite sides, are then wound up together. The free part may, however, be otherwise than at the edge. When wound the two metallic coatings form the electrodes of the capacitor and the free edges provide insulation between the electrodes.

Figure 1 shows an apparatus suitable for producing a coated web suitable for use in the manufacture of such an electrical capacitor. In this embodiment the metal is deposited upon the web by a process of thermal evaporation. The dielectric web 10, of paper, polystyrene or the like from a feed roll 11 passes over guide rollers 12, 13, 14 and 15 to take-up roll 16. Between rollers 14 and 15, the web may engage the surface of a metallising roller 17 at a main metallising station 18, alternatively the rollers 14 and 15 may be positioned immediately adjoining the sides of the metallising aperture.

The web passes a pretreatment metallising station at 19, where an extremely thin and possibly molecular, film of metal is deposited on the web. The film can be of silver or the like metal chosen from sub-group B and of groups 1 or 4 of the periodic system of elements is used to facilitate the deposit of the main coating, which can be, for example, of cadmium metal, which takes place at station 18. The present invention is not primarily concerned with the process adopted for effecting the metallic deposits and they will not be further described here; processes of other than thermal evaporation, for example, the so-called printing or carbonyl processes can be used.

One edge of the web is required to be free of deposit, as described above, and accordingly, use is made of a mask 21 which moves in contact with and at the same speed as the web. In its simplest form the mask consists of a strip, ribbon or tape, which may be of paper, of metal or of the dielectric material, fed from a supply roll 22, passing, in contact with the web, over rollers 12 to 15 and 17, to take-up roll 23.

In moving in this path the mask is so positioned that it covers the area of the web which is to be free of deposit, in this case one edge. At the two metallising positions the deposit is made on both web and mask. Alternatively deposits on the mask can be inhibited at station 18 by the use of an additional fixed mask at station 19.

The roller 17 may be of larger diameter and of large thermal capacity so that it ensures that the mask and web are held closely in contact when the deposit is made, overcoming any tendency of these to separate due, for example, to different thermal coefficients of expansion or different driving powers for the mask and web. A similar effect may be secured without the use of the roller 17 by the close positioning of rollers 14 and 15.

Instead of using the mask fed from the roll 22, an endless mask can be used. In this case the mask can be arranged, as shown diagrammatically in Figure 1, to pass over rollers 12 to 15 and 17 as before, but additionally over rollers 25 and 26, or any further auxiliary rollers to take up any desired length of the mask; a long length of the mask is desirable to minimise the thickness of metal building up on the mask. The mask can be of metal, for example aluminium, and means can be provided, for example at station 27, for coating the mask with a wax, grease or silicone oil to inhibit the deposit of metal on the mask or to make it easier to remove it, for example at station 28. It is important that the grease or the like should not be allowed to reach that area of the web on which the deposit is required, but this can be achieved by close control of the thickness of the grease coating and by using suitable coating and cleansing means.

An alternative method of providing a mask according to the invention employs a pre-wound coil or roll of dielectric and masking material, possibly of the same material, in which the mask occupies the same position relative to the dielectric when wound as it would when acting as a mask during the metallising process. In this case it is preferable for a "filler" having the same thickness as the mask and occupying the unmasked width of the dielectric to be wound into the coil or roll with the mask in order to prevent distortion of the dielectric etc., during winding, storage and unreeling. This "filler" may be conveniently separated from the dielectric and mask by being fed directly from the roll to a take-up spool before the dielectric and mask enter the metallising stages proper.

In a further alternative embodiment of this invention the dielectric is initially wound with masking material of the same overall width as the dielectric and when the roll is unwound in the metallising chamber cutter means slit the masking material into the required sections which return to an intimate contact with the dielectric before metallising and the surplus masking material is fed to a take-up roller as before.

Figure 2:
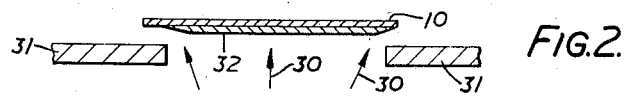

Figure 2 shows the effect of attempting to mask the web by a mask which is not in close contact with the web. It will be readily appreciated that in Figure 2 and in Figures 3 to 13 also, in which the web and the deposit are shown, the relative thicknesses are grossly exaggerated; the figures are not to be taken as being to scale and are for the purposes of illustration only. In practice, the deposit is normally of a thickness of .015 to .5 micron and lying between 1/50 to 1/500 of the thickness of the web. For example, using a paper 10 microns thick the deposit will be of the order of .05 micron thick; with a polystyrene dielectric 13 microns thick the deposit will be of the order of .075 micron thick.

In Figure 2 the dielectric 10 is shown as being coated by metal vapour emerging in the direction of arrows 30 through an aperture or mask 31. The resulting deposit 32 is of comparatively uniform thickness of over the major width of the web, but owing to diffusion at the edges of the aperture the edges of the deposit are ill-defined and taper in thickness.

Figure 3:
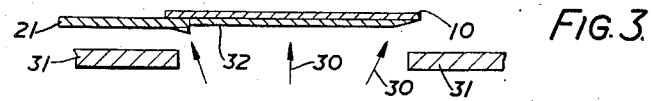

Figure 3 is a diagram similar to Figure 2, but using a mask 21 in the manner described above. The resulting deposit 32 is partly on the dielectric and partly on the mask, and when the two are separated the free, uncoated, edge is well defined, as indicated in Figure 4.

Figure 4:

Figures 3 and 4 also show that the right hand edge of the deposit is also of tapering thickness and in a capacitor where connection is made to the electrode at this point, this is undesirable; in a further embodiment of the invention this effect is avoided and in addition a separate web material is made unnecessary.

Figure 5:

After the metallising process described above and with reference to Figure 3, if virgin material is used for the mask it will have upon its one edge a deposit as shown in Figure 5, tapering in thickness, though owing to the thinness of the deposit the taper is not in practice completely regular as shown. If the mask is itself of dielectric material it can now be used as the web 10, as in Figure 6 the initial deposit will supplement the second deposit in the manner indicated to produce a greater thickness of metal at the right hand edge or alternatively if the second deposit is suitably located, one which is aproximately uniform across the width of the dielectric web. The web used as the mask in making the deposit as in Figure 6 can in turn be used as the web for the next deposit and so on.

Figure 7:
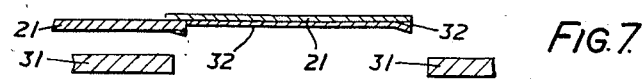

In view of the conditions which exist at the tapering edge of the deposit it may be preferable to arrange, by positioning the right hand mask 31, that a full deposit of metal be made up to the edge of the web as indicated in Figure 7 so that there is a normal increase of thickness of the deposit at the edge.

The apparatus of Figure 1 can be used for carrying out the metallising process described with reference to Figures 6 or 7. When using webs on two feed rolls one web is used as the mask for operation, and in the next operation it is used as the web. Alternatively, one web can be used in which case the web can be made to provide its own mask; the web passes from the feed roll 11, over rollers 12 to 15 in the position of the mask or the web, thence over further guide rollers, such as 25 and 26, and then again over rollers 12 to 15, this time in the position of web or mask, as the case may be. In this case, the spiral action of the web is most readily obtained by employing "off-set" or "skewed" feed and take up rolls in conjunction with the system of parallel equispaced rollers in the metallising field.

Figure 8:
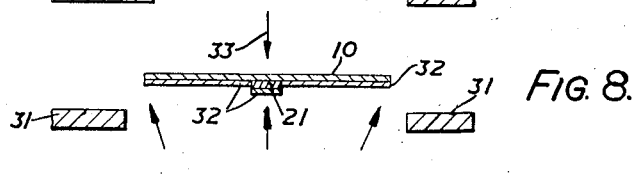

It is not necessary that the masks should be arranged along the edge of the metallised web 10, and in Figure 8 there is shown web 10 with a centrally disposed mask 21, in the form of a narrow strip. In this case the outer edges of the web 10 are disposed well within the edge masks 31, so that a full edge coating is obtained. The resulting web will have a central uncoated portion, and by slitting the web at 33 there are obtained at the same time rolls with left hand and right hand free edges. This arrangement can be modified by the use of a plurality of masks simultaneously, so that several webs can be obtained at the same time.

Figure 6:
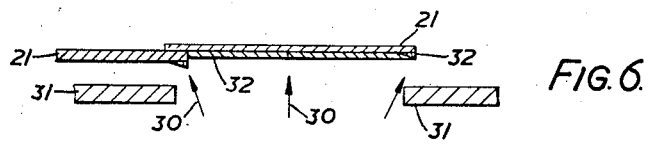

The arrangement of Figures 6 and 7 can be modified whereby three or more webs can be simultaneously coated as shown in Figure 9. In Figure 9 are shown web 10, which has already been used as a mask, and mask 21, itself a web of dielectric. In addition two further webs 34 and 35 are used, with edges overlapping as shown. It will be seen that webs 34 and 35 are completely coated, in the desired manner, in one pass through the metallising chamber.

Figure 10 shows another method of providing the desired mask moving with the web, and in this case also the mask is provided by the web. With the arrangement of Figure 10, the web used is rather more than twice the width of the coated web ultimately required. By means of forming guides and rollers located between roller 12 and the pretreatment metallising station 19 of Figure 1, the two edges of the web 10 are turned over as indicated at 10a, 10b, and the web is then coated over a width sufficient to give a uniform coating over the single thickness of the web. When so coated, the web is slit longitudinally at positions 36, 37 and 38; after discarding the outermost cut portions two strips, coated as desired, are obtained, as shown in Figure 11. It is advantageous that by this process the two webs produced are of opposite "hand."

In a further embodiment of the invention shown in Figure 12, at least one edge of the web 10 is turned at 10a, though in this case the turned edge is made somewhat narrower than with the process described with reference to Figure 10. The web is then coated over substantially its entire width, as at 32. It has been found possible to open out the folded edged edge after it has been coated and the resulting web will then be as shown at 40 in Figure 13; the web has the main coating 32 as before on the one surface and a small edge coating 41 on its other surface.

If a left hand and right hand web are made in this way, the resulting assembly is as shown in Figure 13, which is an exploded cross-section of four adjacent thicknesses of the web. It will be seen that the coating 41 on the surface of one web will lie adjacent the possibly tapering edge of the coating 32 of the web immediately above it. The two coatings are thus additive, and produce a full thickness coating at the terminal edge of the web where it is necessary if a good connection to the electrode is to be obtained. Although the two deposits 32 and 41 at the edge of the web are not deposited integrally on the same web, it is found that adequate contact between them is obtained by normal winding tensions. Terminal wires can be secured without difficulty to the end faces of the rolls so made, since the metallising coatings, existing up to and covering the extreme edges of the webs reduces the effect of misalignment or wander of the web during winding.

A further arrangement of the webs is shown in Figure 14. Two dielectric webs 50 are overlapped by four dielectric webs 51, which act as masks for both edges of the webs 50, and three further webs 52 are used to mask one edge of each of webs 51. The whole width of the assembly of webs is metallised, and after metallisation the webs 52 are discarded. The webs 50, with both edges free of metallising, can be slit, as by a knife at 54, to give a left hand and right hand dielectric strip and of the four dielectric strips 51 two are left hand and two are right hand.

The spooling arrangement of Figure 14 can be as shown in Figure 15. The webs 50 are wound on two supply reels 56 disposed on a common shaft; the four webs 51 are on reels 57 on a further and common shaft and the webs 52 are on reels 58 on another and common shaft. The various reels are disposed at appropriate axial points along the shafts to correspond to the positions shown in Figure 14. The shafts are driven and the reels driven from the shafts by friction pads splined to the shafts and engaging the reels.

Webs 50, 51, 52 pass over a guide 60, and then over a further guide 61; between these guides the webs can be pre-treated as described above. From guide 61 the webs pass over idler 62 associated with the metallising apparatus at 63, and thence to guide 64. From guide 64 the webs pass around a drive roller 65, driven at constant speed, from which they pass respectively to reels 66, 67, 68 the two latter webs 51, 52 over guides 70, 71.

While in the foregoing description reference has been made to the production of metallic coatings upon the web of dielectric material, it is possible to use the process for non-metallic coatings. In particular, and as mentioned above dielectric or insulating coatings, as of suitable lacquer, can be deposited in the manner described.

We claim:

1. The method of producing a coating deposit upon a limited area of a web-like support which comprises holding a first length of said support in contacting overlapping relation with a second length of said support and moving said lengths together and in contact as a unit past means for effecting said deposit upon portions of both said lengths whereby said second support serves as a mask to prevent deposit upon an overlapped area of said first length and itself receives a deposit over only an edge region thereof, and simultaneously a non-overlapped area of said first length receives a deposit thereover, and subsequently moving said second support past means for effecting a further deposit thereon whereby said second support receives a further deposit which at least partly overlies and is reinforced by the deposit previously received over said edge region.

2. The method of producing a coating deposit upon a limited area of a web-like support as set forth in claim 1 in which said first and second lengths of support are constituted by adjacent widths of a single support folded lengthwise so that one width overlaps part of the other.

3. The method of producing a coating deposit upon a limited area of a web-like support as set forth in claim 2 in which said folded support is thereafter unfolded and the deposit of coating on the unfolded edge serves to reinforce a further deposit on a separate support positioned in contact with said deposit on said unfolded edge.

4. The method of producing a coating deposit upon a limited area of a web-like support which comprises holding a first length of said support in contacting overlapping relation with a second length of said support and moving said lengths together and in contact as a unit past means for effecting said deposit upon portions of both said lengths whereby said second support serves as a mask to prevent deposit upon an overlapped area of said first length and itself receives a deposit over only an edge region thereof and simultaneously a non-overlapped area of said first length receives a deposit thereover, and subsquently holding said second support in contacting overlapping relation with a third length of said support, which third length covers a portion of said second length not previously coated, and moving said second and third lengths together and in contact past means for effecting a further coating deposit upon portions of both said second and third lengths whereby said third support serves as a mask to prevent deposit upon an overlapped area of said second length and itself receives a deposit over an edge region thereof and simultaneously a non-overlapped area of said second length receives a further deposit thereover, the initial deposit on the edge region of said second length serving to reinforce the further deposit on said second length of support.

5. The method of producing a coating deposit upon a limited area of a web-like support which comprises holding a length of web-like support material in contacting overlapping relation with a discrete length of web-like support material and moving said lengths together and in contact as a unit past means for effecting a coating deposit upon portions of both said lengths whereby one of said lengths of material serves as a mask to prevent deposit upon an overlapped area of the other length of material and itself receives a deposit over only an edge region thereof, and simultaneously a non-overlapped area of the other length receives a deposit thereover, and subsequently moving said one length of material past means for effecting a further deposit thereon which further deposit at least partly overlies and is reinforced by the deposit previously received over said edge region.

6. The method of producing a coating deposit upon a limited area of a web-like support which comprises holding a length of web-like support material in contacting overlapping relation with a discrete length of web-like support material and moving said lengths together and in contact as a unit past means for effecting a coating deposit upon portions of both said lengths whereby one of said lengths of material serves as a mask to prevent deposit upon an overlapped area of the other length of material and itself receives a deposit over an edge region thereof, and simultaneously a non-overlapped area of the other length receives a deposit thereover, and subsequently holding said one length of material in contacting overlapping relation with a further discrete length of web-like support material, which further discrete length of material covers a portion of said one length of material not previously coated, and moving said one and said further lengths together and in contact past means for effecting a further coating deposit on portions of both said one and said further lengths whereby said further length serves as a mask to prevent deposit upon an overlapped area of said one length and itself receives a deposit over only an edge region thereof, the initial deposit on the edge region of said one length serving to reinforce the further deposit on said one length.

References Cited in the file of this patent

UNITED STATES PATENTS

| | | |
|---|---|---|
| 1,840,052 | O'Donnell | Jan. 5, 1932 |
| 2,117,455 | Sandler | May 17, 1938 |
| 2,559,351 | Drake et al. | July 3, 1951 |
| 2,590,557 | Melsheimer | Mar. 25, 1952 |
| 2,639,490 | Brennan | May 26, 1953 |
| 2,683,792 | Dubilier | July 13, 1954 |